United States Patent
Kuwata

(10) Patent No.: US 7,441,139 B2
(45) Date of Patent: Oct. 21, 2008

(54) SKEW ADJUSTING CIRCUIT AND METHOD FOR PARALLEL SIGNALS

(75) Inventor: Naoki Kuwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 456 days.

(21) Appl. No.: 11/284,333

(22) Filed: Nov. 21, 2005

(65) Prior Publication Data

US 2007/0050658 A1 Mar. 1, 2007

(30) Foreign Application Priority Data

Aug. 24, 2005 (JP) ............................ 2005-242278

(51) Int. Cl.
*G06F 11/00* (2006.01)
*H04L 7/00* (2006.01)

(52) U.S. Cl. .................... 713/503; 375/371; 375/355

(58) Field of Classification Search ................. 713/503
See application file for complete search history.

(56) References Cited

U.S. PATENT DOCUMENTS 6,480,021 B2 * 11/2002 Deas et al. ................. 326/30
7,054,401 B2 * 5/2006 Kada et al. ................. 375/355
7,123,660 B2 * 10/2006 Haq et al. ................... 375/257
2002/0009169 A1 * 1/2002 Watanabe ................... 375/371

FOREIGN PATENT DOCUMENTS

| JP | 10-164037 | | 6/1998 |
| JP | 11074945 A | * | 3/1999 |
| JP | 2004-531117 | | 10/2004 |
| WO | WO 02/069552 | | 9/2002 |

* cited by examiner

*Primary Examiner*—Suresh K Suryawanshi
(74) *Attorney, Agent, or Firm*—Katten Muchin Rosenman LLP

(57) ABSTRACT

The skew adjusting circuit for parallel signals includes: a deskew signal generating circuit which generates a deskew signal by performing a predetermined logical operation and transmits the deskew signal to a receiving circuit; a skew detecting circuit which detects the skew by obtaining correlation between the deskew signal and the data signal and then obtaining an average value of the correlation; and a delay amount adjusting circuit which adjusts the skew by controlling the amount of delay of the data signal in accordance with the average value obtained by the skew detecting circuit. As a result, it is possible to reduce power consumption and circuit size, while suppressing the number of logic processing circuits to be added for skew adjustment, when parallel signals are transmitted in circuits which needs high-speed characteristic.

15 Claims, 12 Drawing Sheets

FIG. 14
PRIOR ART

| Bit time | Value | Value | Value | Value | Comments |
|---|---|---|---|---|---|
| 1 - 32 | A1<br>1111 0110 | A1<br>1111 0110 | A2<br>0010 1000 | A2<br>0010 1000 | Framing bytes |
| 33 - 64 | EH1<br>1010 1010 | EH2<br>1010 1010 | EH3<br>1010 1010 | EH4<br>1010 1010 | Expansion Header bytes<br>For future use |
| 65 - 96 | R/TXDATA[15]<br>Bits 1 - 8 | R/TXDATA[15]<br>Bits 9 - 16 | R/TXDATA[15]<br>Bits 17 - 24 | R/TXDATA[15]<br>Bits 25 - 32 | 64 consecutive bits from RXDATA[15] or TXDATA[15] |
| 97 - 128 | R/TXDATA[15]<br>Bits 33 - 40 | R/TXDATA[15]<br>Bits 41 - 48 | R/TXDATA[15]<br>Bits 49 - 56 | R/TXDATA[15]<br>Bits 57 - 64 | |
| 129 - 160 | R/TXDATA[14]<br>Bits 1 - 8 | R/TXDATA[14]<br>Bits 9 - 16 | R/TXDATA[14]<br>Bits 17 - 24 | R/TXDATA[14]<br>Bits 25 - 32 | 64 consecutive bits from RXDATA[14] or TXDATA[14] |
| 161 - 192 | R/TXDATA[14]<br>Bits 33 - 40 | R/TXDATA[14]<br>Bits 41 - 48 | R/TXDATA[14]<br>Bits 49 - 56 | R/TXDATA[14]<br>Bits 57 - 64 | |
| 193 - 1024 | | | | | 64 consecutive bits from each of RXDATA[13] to RXDATA[1] or TXDATA[13] to TXDATA[1] |
| 1025 - 1056 | R/TXDATA[0]<br>Bits 1 - 8 | R/TXDATA[0]<br>Bits 9 - 16 | R/TXDATA[0]<br>Bits 17 - 24 | R/TXDATA[0]<br>Bits 25 - 32 | 64 consecutive bits from RXDATA[0] or TXDATA[0] |
| 1057 - 1088 | R/TXDATA[0]<br>Bits 33 - 40 | R/TXDATA[0]<br>Bits 41 - 48 | R/TXDATA[0]<br>Bits 49 - 56 | R/TXDATA[0]<br>Bits 57 - 64 | |

(FRAME LENGTH → 1088bits/frame = 0.44μs/frame @ 2.5Gb/s)

SKEW ADJUSTING CIRCUIT AND METHOD FOR PARALLEL SIGNALS

CROSS REFERENCE TO RELATED APPLICATIONS

This application is based on and hereby claims priority to Japanese Application No. 2005-242278 filed on Aug. 24, 2005 in Japan, the contents of which are hereby incorporated by reference.

BACKGROUND OF THE INVENTION (1) Field of the Invention

The present invention relates to a skew adjusting circuit and method for parallel signals. The invention relates to technology suitable for use in phase matching among parallel signals when a high-speed signal at a bit rate of, e.g., 40 Gb/s is transmitted as parallel signals of 10 Gb/s×4 channels.

(2) Description of the Related Art

Recently, in optical communication systems, the volume of transmission has been raised by increasing the bit rate. In apparatuses in optical communication systems, when signal transmission is performed between various modules, ICs (Integrated Circuits), and LSIs (Large Scale Integrations), etc., a signal is made into parallel signals to reduce the speed, thereby making signal processing by low-speed devices possible. Since the transmission speed of each channel is lowered when the number of signals paralleled is increased, the high-speed characteristics required in the devices are reduced, and phase matching among parallel signals becomes easy to obtain. However, problems of increase in the numbers of ICs, LSIs, pins of modules, in the package size, and in the packaging area of transmission lines arise.

Today, as a method for parallel transmission of a signal at a bit rate of 40 Gb/s, the scheme of SFI (Serdes Framer Interface)-5, in which 2.5 Gb/s×16 channels are transmitted, is standardized by the OIF (Optical Internetworking Forum). This SFI-5 is a scheme which is based on the assumption that phase shift is caused in transceiving interfaces and transmission paths, and it includes a deskew circuit for restoring the phase.

FIG. 12 is a block diagram showing a construction of a 40 Gb/s transponder module in conformity with SFI-5; FIG. 13 is a block diagram showing a construction with attention paid to the transmitter-end interface (IF) and the receiver-end interface (IF) of FIG. 12.

First of all, as shown in FIG. 12, the transponder module includes: a framer (or FEC) 100 having a transmitter-end IF 101 and a receiver-end IF 102 in conformity with SFI-5; and a transponder unit 200. The transponder unit 200 includes: serializer/deserializer (SERDES) unit 208 having a receiver-end IF 201 and a transmitter-end IF 206 which are in conformity with SFI-5, a 16:1 multiplexing (MUX) circuit 202; a clock data recovery (CDR)/1:16 demultiplexing (DMUX) circuit 205; an electric/optic converter unit 203; optic/electric converter unit 204; and a CPU 207.

In such a construction, a data signal (main signal) at a bit rate of 40 Gb/s is transceived in the form of parallel signals of 2.5 Gb/s×16 channels, together with a deskew signal of 2.5 Gb/s×1 channel, between the transmitter-end IF 101 of the framer 100 and the receiver-end IF 201 of the transponder unit 200 (SERDES unit 208), and between the transmitter-end IF 206 of the transponder unit 200 (SERDES unit 208) and the receiver-end IF 102 of the framer 100 (that is, a total of 2.5 Gb/s×17 channels, including a 2.5 Gb/s deskew channel, are transceived in parallel).

The parallel data signals of 2.5 Gb/s×16 channels received by the receiver-end IF 201 are subjected to phase shift (skew) detection between data signals of the different channels. The skew detection and compensation are performed using the above-mentioned deskew signal from the transmitter-end IF 101. The resultant signals are multiplexed by the MUX circuit 202 into a serial signal at a bit rate of 40 Gb/s, and are then converted into an optical signal at a bit rate of 40 Gb/s. After that the optical signal is sent out onto an optical transmission path (optical fiber) 300.

On the other hand, an optical signal at a bit rate of 40 Gb/s transmitted from the opposite optical transmission path 400 is converted by the optic/electric converter unit 204 into an electrical signal at a bit rate of 40 Gb/s. After that, the electrical signal is subjected to clock and data recovery processing performed by the CDR/DMUX circuit 205. The resultant signal is converted into parallel signals of 2.5 Gb/s×16 channels, and is then sent out by the transmitter-end IF 206 to the receiver-end IF 102 of the framer 100 in the form of 17 parallel signals including a 2.5 Gb×1 channel deskew signal. On the receiver-end IF 102, like the receiver-end IF 201, skew between the 16 parallel data signals is detected and compensated for using the deskew signal from the transmitter-end IF 206. In this instance, the operation of the above electric/optic converter unit 203, optic/electric converter unit 204, MUX circuit 202, and CDR/DMUX circuit 205 is integratedly monitored and controlled by the CPU 207.

As described so far, in the above-described transponder module, skew among parallel signals of 16 channels transmitted between the transmitter-end IF 101 (206) and the receiver-end IF 201 (102), is detected and compensated for by using a deskew signal. Thus, as shown in FIG. 13, the deskew signal generating circuit 500 is provided for the transmitter-end IF 101 (206), and the deskew circuit 600 is provided for the receiver-end IF 201 (102).

In more detail, the transmitter-end IF 101 (206) includes a framing controller 501, a 16:1 multiplexing (MUX) circuit 502, and a selector 503, which serve as the deskew signal generating circuit 500. The transmitter-end IF 101 (206) also includes a core logic circuit 510 for outputting data signals of 2.5 Gb×16 channels and buffers 511, providing one for each of the parallel data signals. The receiver-end IF 201 (102) includes: a data recovery (DR) circuit 601 and a buffer 602, which are provided for a deskew signal; DR circuits 603, buffers 604, and variable delay circuits 605, which are provided, one for each of the data signals on 16 channels; a multiplexing (MUX) circuit 606 (equivalent to the MUX circuit 202 of FIG. 12) for multiplexing and outputting the parallel signals on the 16 channels; a deskew controller 607 for compensating for skew among the parallel data signals by controlling the delay amount of each of the variable delay circuit 605. Here, a block including the variable delay circuits 605 and deskew controller 607 functions as the above-mentioned deskew circuit 600.

In the transmitter-end IF 101 (206) with the above construction, parallel data signals of 2.5 Gb/s×16 channels are output from the core logic circuit 510. After being temporarily held in buffers 511, the signals are then transmitted to the receiver-end IF 201. Here, according to SFI-5, design is performed so that output skew among channels from the transmitter-end IF 101 (206) is within 3 UIs (Unit Intervals) [1 UI=1 bit (400 pico seconds)].

In this instance, a part of the output of each buffer 511 is split to be input to the 1:16 multiplexing unit 502. Under control of the framing controller 501, the split signals are selectively output to the selector 503. The selector 503 selectively outputs the split signal or a signal from the framing controller 501, thereby generating a deskew signal with a predetermined frame format.

More precisely, the frame format of a deskew signal according to SFI-5 has 1088 bits per frame, as shown in FIG. 14. Using the leading 1st through 32nd bits (4 bytes), A1 byte (11110110) and A2 byte (00101000), which are frame synchronization patterns, are transmitted. Using the 65th through 128th bits (64 bits/8 bytes), a data signal of the channel number #15, out of the channel number #0 through #15, is transmitted. Using the 129th through 192nd bits (64 bits/8 bytes), a data signal of the channel number #14 is transmitted. Likewise, using the 193rd through 1088th bits, data signals of the channel number #13 through #0 are transmitted. Here, the 33rd through the 64th bits (four bytes) are defined to be an expansion header for future use.

By transmitting the deskew signal with such a frame format, together with 16-channel parallel signals, the receiver-end IF 201 (102) detects the above frame synchronization pattern (A1 and A2 bytes) of the deskew signal, thereby uniquely defining the placement (that is, reception timing) of the data signal on each channel. At this timing, successive pattern matching in 8-byte (64-bit) units is performed, whereby skew among the channels is detected.

That is, on the receiver-end IF 201 (102), the deskew signal, generated and transmitted from the transmitter-end IF 101 (206), is subjected to data recovery processing by a DR circuit 601. After being temporarily held in the buffer 602, the deskew signal is input to the deskew controller 607.

The deskew controller 607 detects the above-mentioned frame synchronization pattern (A1 and A2 bytes) of the deskew signal, thereby confirming the placement (reception timing) of the data signal of each channel. At this timing, like the above deskew signal, parallel data signals on 16 channels, after being subjected to data recovery processing by the DR circuit 603 and temporarily held in the buffer 64, are subjected to successive pattern matching in 8-byte (64-bit) units, whereby skew among the channels is detected.

After that, the deskew controller 607 individually controls the delay amounts of the variable delay circuits 605 so that skew disappears, thereby compensating for the skew among the parallel signals of 16 channels. Here, according to SFI-5, design is performed so that input permission skew on the receiver-end IF 201 (102) is within 6 UI (that is, skew within 6 UI can be compensated for).

Then, after compensation for the skew among the channels, the parallel data signals are multiplexed into a serial signal by MUX circuit 606 (202), and are then output as a signal at a bit rate of 40 Gb/s.

In this instance, as a circuit for adjusting skew among data bits, there is an art (hereinafter will be called publicly known art 1) disclosed in the following patent document 1. In this publicly known art 1, skew is adjusted on the receiver end based on a pseudo random pattern (PN pattern) produced on the transmitter end. This art is considered to be an art in which a PN pattern is used in place of a deskew signal.

Further, there is an art (hereinafter will be called publicly known art 2) proposed in the patent document 2 as a data capturing technique for high-speed signaling which makes possible the optimum sampling of non-synchronized data stream. This publicly known art 2 uses a delayed signal (delay tap output) of an original signal as a history record. This history record is tested, whereby optimum sampling is available.

[Patent Document 1] Japanese Patent Application Laid-open No. HEI 10-164037
[Patent Document 2] Published Japanese Translation of PCT application, No. 2004-531117

However, in the transponder module in conformity with SFI-5, the circuit size of the deskew signal generating circuit 500 and the deskew circuit 600, which performs deskew processing based on the generated deskew signal is large, so that power consumption and the circuit size are increased.

In particular, in the transponder 200, a high-speed characteristic is needed by the MUX circuit 202 (606) and the DMUX circuit 205, which are conversion circuits between parallel signals and a serial signal having an optical transmission speed, and the deskew circuit 600 is also needed. Therefore, realizing these points is a problem that needs solving. That is, according to previous technology, for realizing deskew, a logic circuit with hundreds to thousands of gates is needed, and realizing this with circuits superior in speed is extremely difficult due to power consumption and circuit size.

Further, as a next generation scheme, transmission of parallel signals of 10 Gb/s×4 channels is under consideration. Thus, power consumption and circuit size with respect to the MUX circuit 202 (606) and the DMUX circuit 205 become highly problematic. Here, simple application of the above publicly known arts 1 and 2 won't solve the problem unique to the transponder module in which high-speed characteristics are needed.

SUMMARY OF THE INVENTION

With the foregoing problems in view, it is an object of the present invention to reduce power consumption and circuit size while suppressing increase in the number of logic processing circuits to be added for skew adjustment (skew detection and deskew) when parallel signals are transmitted in circuits which need high-speed characteristics.

In order to accomplish the above object, according to the present invention, there are provided a skew adjusting circuit for parallel signals and a skew adjusting method with the following characteristic features.

(1) As a generic feature, there is provided a skew adjusting circuit for parallel signals, which circuit adjusts skew among parallel signals when data signals are transmitted in parallel from a transmitting circuit to a receiving circuit. The skew adjusting circuit comprises: a selecting circuit which sequentially selects each of the parallel signals; a deskew signal generating circuit which generates a deskew signal, which is for adjusting skew, by performing a predetermined logical operation using a plurality of successive bits of a data signal selected by the selecting circuit and transmits the deskew signal to the receiving circuit; a skew detecting circuit provided for the receiving circuit, which circuit detects the skew by obtaining correlation between the deskew signal and the data signal selected by the selecting circuit and then obtaining an average value of the correlation; and a delay amount adjusting circuit provided for the receiving circuit, which circuit adjusts the skew by controlling the amount of delay of the data signal in accordance with the average value obtained by the skew detecting circuit.

(2) As a preferred feature, the deskew signal generating circuit includes a logical circuit which performs the logical operation using the plurality of successive bits of the data signal so that the average value, which is obtained by the skew detecting circuit in accordance with the amount of skew, reveals a specified change.

(3) As another preferred feature, the logical circuit performs the logical operation using three successive bits of the data signal so that when the skew of the data signal with a mark rate of ½ is 0 bits, 1-bit advanced, and 1-bit delayed, the average value obtained by the skew detecting circuit is ½, ¼, and ¾, respectively.

(4) As yet another preferred feature, the logical circuit includes: a first AND circuit which carries out the logical AND between an inversion signal of a 2-bit delayed signal of the data signal and a 1-bit delayed signal of the data signal; a second AND circuit which carries out the logical AND between the data signal and an inversion signal of a 1-bit delayed signal of the data signal; and a first OR circuit which generates the deskew signal by carrying out the logical OR between the outputs of the first and second AND circuits.

(5) As a further preferred feature, the logical circuit includes: a third AND circuit which carries out the logical AND between an inversion signal of a 2-bit delayed signal of the data signal and an inversion signal of a 1-bit delayed signal of the data signal; a fourth AND circuit which carries out the logical AND between a 1-bit delayed signal of the data signal and the data signal before being delayed; and a second OR circuit which generates the deskew signal by carrying out the logical OR between the outputs of the third and fourth AND circuits.

(6) As a still further preferred feature, the logical circuit includes: a fifth AND circuit which carries out the logical AND between a 2-bit delayed signal of the data signal and an inversion signal of a 1-bit delayed signal of the data signal; a sixth AND circuit which carries out the logical AND between a 1-bit delayed signal of the data signal and the data signal before being delayed; and a third OR circuit which generates the deskew signal by carrying out the logical OR between the outputs of the fifth and sixth AND circuits.

(7) As another preferred feature, the logical circuit includes: a seventh AND circuit which carries out the logical AND between a 2-bit delayed signal of the data signal and a 1-bit delayed signal of the data signal; an eighth AND circuit which carries out the logical AND between an inversion signal of a 1-bit delayed signal of the data signal and an inversion signal of the data signal before being delayed; and a fourth OR circuit which generates the deskew signal by carrying out the logical OR between the outputs of the seventh and eighth AND circuits.

(8) As yet another preferred feature, the logical circuit performs the logical operation using five successive bits of the data signal so that when the skew of the data signal with a mark rate of ½ is 0 bits, 2-bit advanced, 1-bit advanced, 1-bit delayed, and 2-bit delayed, the average value obtained by the skew detecting circuit is 4/8, 2/8, 3/8, 5/8, and 6/8, respectively.

(9) As a further preferred feature, the skew detecting circuit includes: an exclusive OR circuit which obtains the correlation by carrying out the exclusive OR between the deskew signal and the data signal; and an average circuit which averages a result of the exclusive OR carried out by the exclusive OR circuit.

(10) As another generic feature, there is provided a skew adjusting method for adjusting skew among parallel signals when data signals are transmitted in parallel from a transmitting circuit to a receiving circuit. The method comprises: sequentially selecting each of the parallel signals; generating a deskew signal, which is for adjusting skew, by performing a predetermined logical operation using a plurality of successive bits of a selected data signal, and transmitting the deskew signal to the receiving circuit; detecting, in the receiving circuit, the skew by obtaining correlation between the deskew signal and the selected data signal and then obtaining an average value of the correlation; and adjusting, in the receiving circuit, the skew by controlling the amount of delay of the data signal in accordance with the average value.

According to the present invention, a deskew signal is generated from some successive bits of a data signal which is transmitted as parallel signals. In a receiving circuit, correlation between the data signal and the deskew signal is obtained and averaged, thereby detecting skew corresponding to change in the average value. The skew is deskewed by controlling the delay amount of the data signal, so that skew detection and deskew can be performed with the above-mentioned average value, without the necessity of comparing individual bits (bit pattern matching).

Accordingly, when a high-speed signal at a bit rate of 40 Gb/s is transmitted as parallel signals of 10 Gb/s×4 channels, it is unnecessary to perform large-scale logic processing such as frame synchronization and pattern matching of individual bits of the data signal of each channel, so that considerable reduction in circuit size and power consumption are available.

Other objects and further features of the present invention will be apparent from the following detailed description when read in conjunction with the accompanying drawings.

BRIEF DESCRIPTION OF THE DRAWINGS

FIG. 14 is a diagram showing a format of a deskew signal which is in conformity with SFI-5.

DESCRIPTION OF THE PREFERRED EMBODIMENT(S)

(A) First Embodiment

Figure 1:
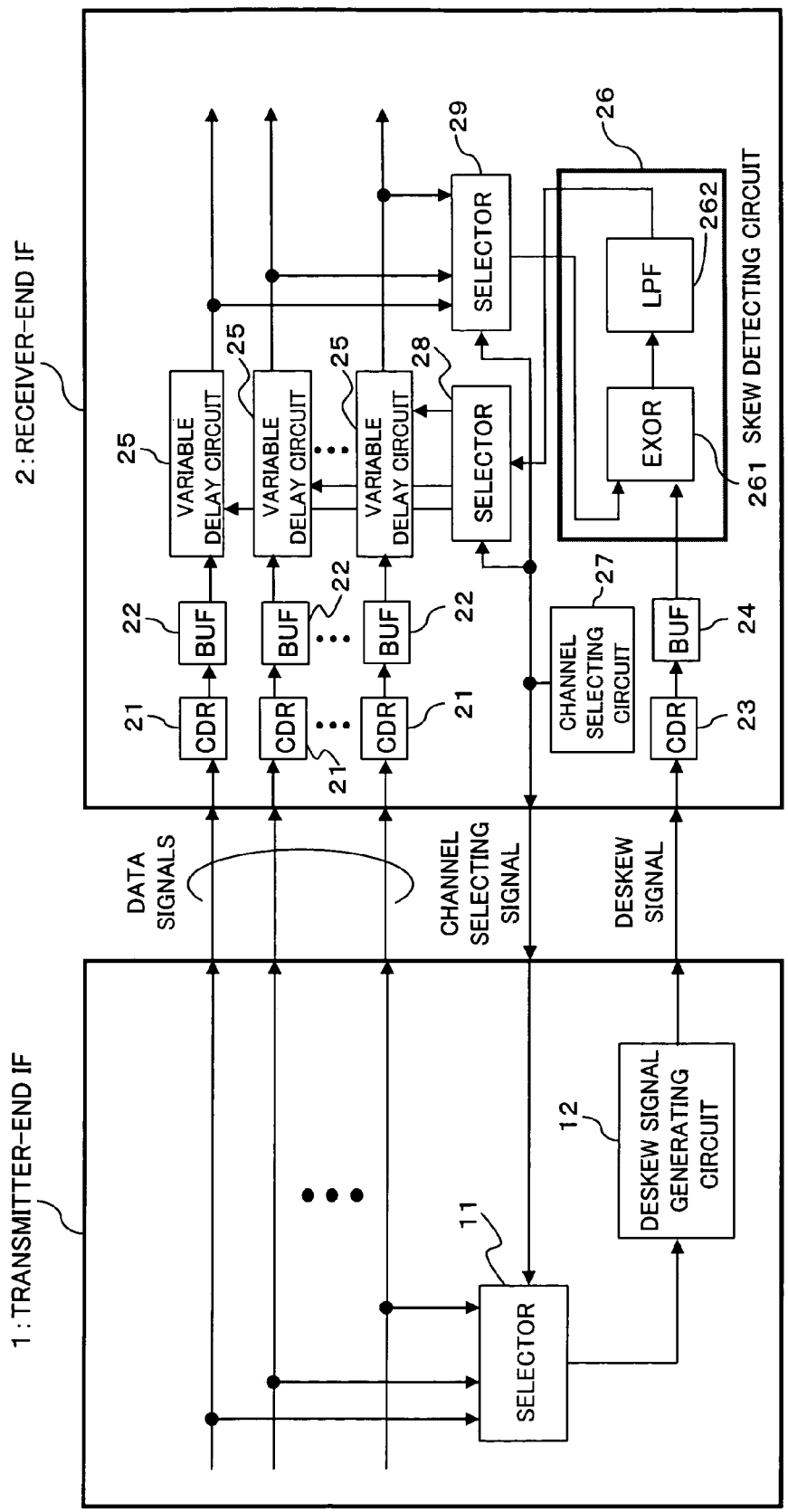
FIG. 1 is a block diagram showing constructions of a transmitter-end interface (IF) and a receiver-end interface (IF) to which is applied a skew adjusting circuit for parallel signals according to a first embodiment of the present invention.
Figure 12:
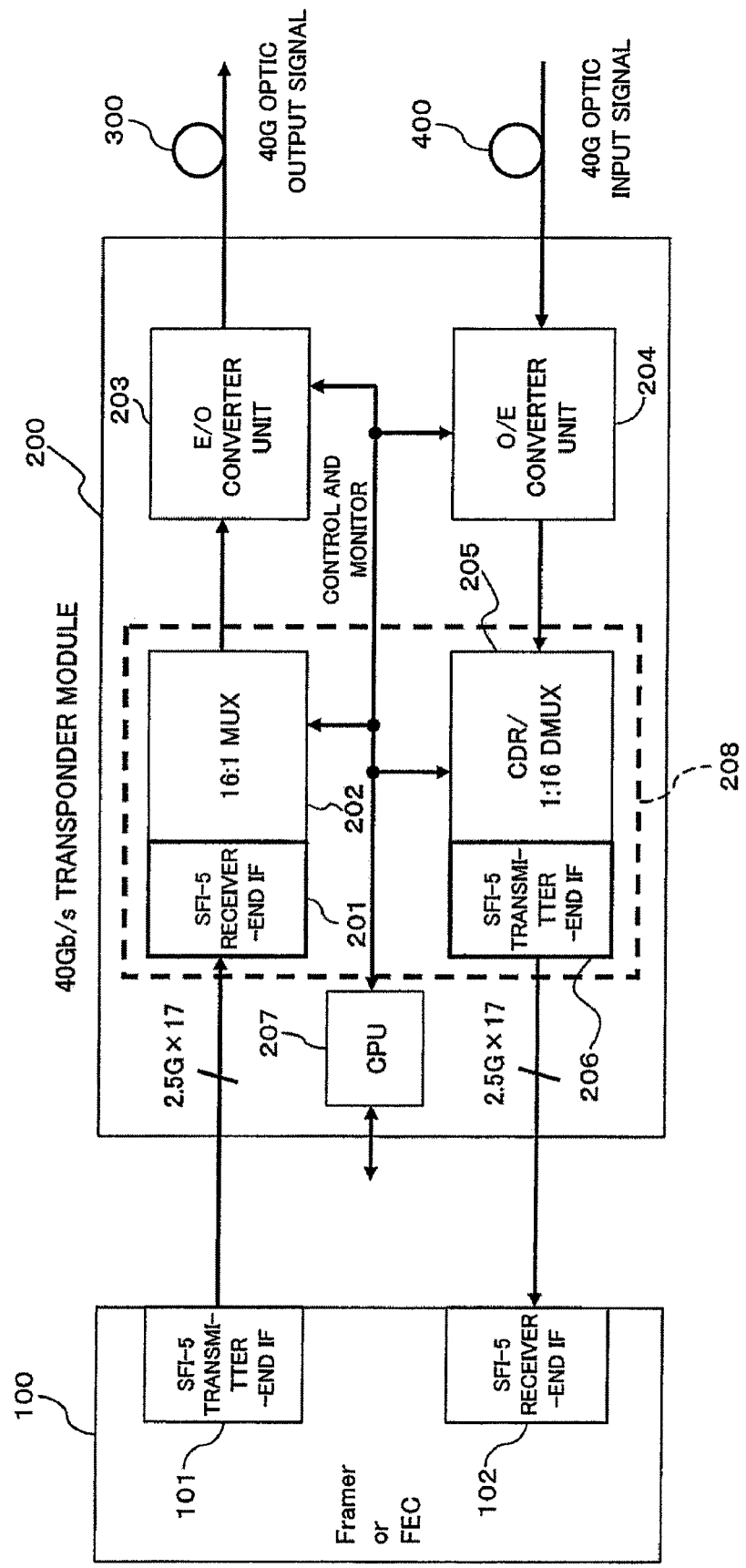
FIG. 12 is a block diagram showing a construction of a 40 Gb/s transponder module in conformity with SFI-5.
Figure 13:
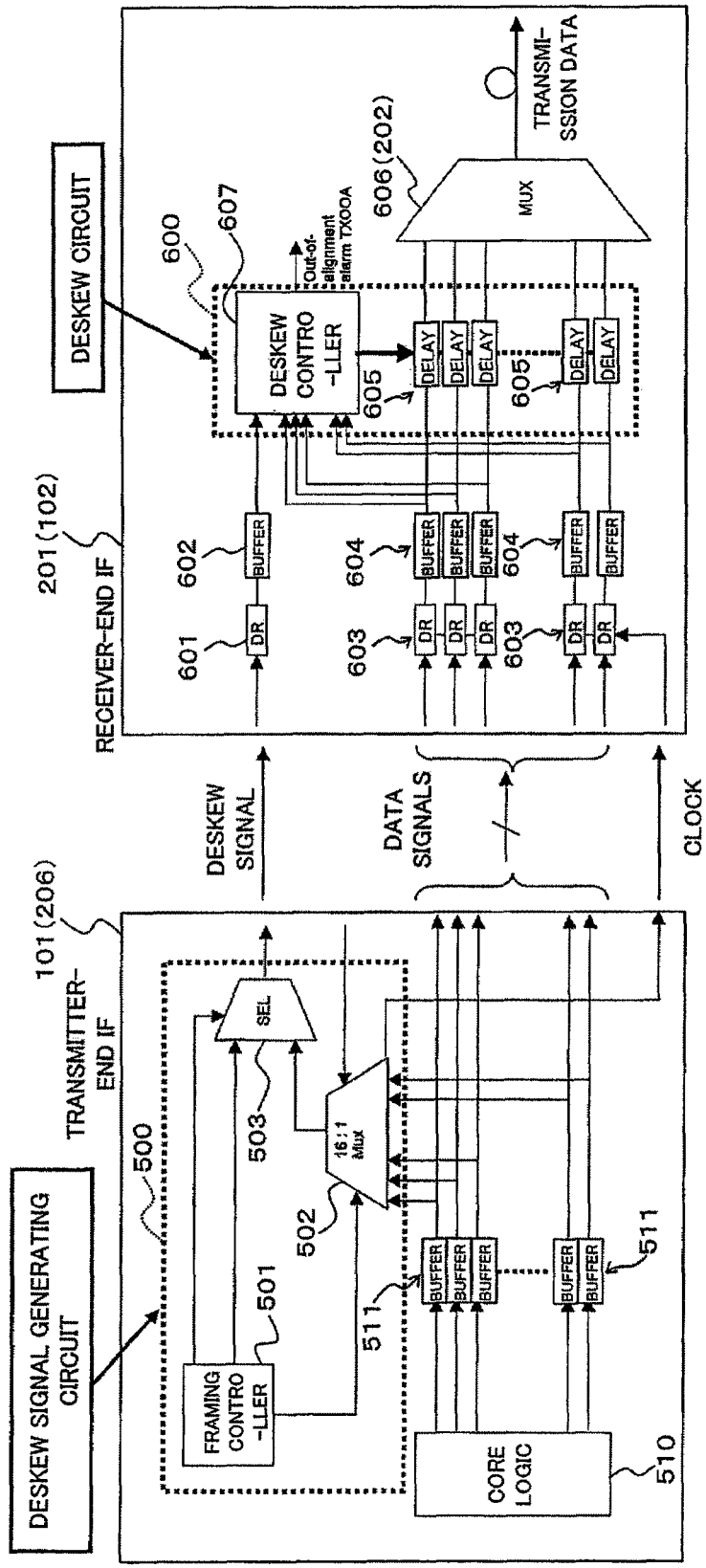
FIG. 13 is a block diagram showing a construction with attention paid to the transmitter-end interface and the receiver-end interface of FIG. 12.

FIG. 1 is a block diagram showing constructions of a transmitter-end interface (IF) and a receiver-end interface (IF) to which is applied a skew adjusting circuit for parallel signals according to a first embodiment of the present invention. The transmitter-end IF (transmitting circuit) 1 of FIG. 1 and FIG. 2 can be applied as, for example, the transmitter-end IF 101 or 206 in the transponder module described above with reference to FIG. 12; the receiver-end IF (receiving circuit) 2 can be applied as the receiver-end IF 201 or 102 in the same module. With attention paid to the important parts of the transmitter-end IF 1 and the receiver-end IF 2, the transmitter-end IF 1 includes: a selector 11; a deskew signal generating circuit 12. The receiver-end IF 2 includes: a Clock Data Recovery (CDR) circuit 21; a buffer 22; and a variable delay circuit 25. These three are provided for each of the parallel data signals (main signals) of multiple channels (e.g., 10 Gb/s×4 channels). The receiver-end IF 2 further includes: a CDR circuit 23 and a buffer 24 for a deskew signal from the deskew signal generating circuit 12; a skew detecting circuit 26; a channel selecting circuit 27; and selectors 28 and 29.

In the transmitter-end IF 1, the selector 11 sequentially selects each of the data signals (main signals) of the above channels in accordance with a channel selecting signal from the channel selecting circuit 27 of the receiver-end IF 2 and outputs the selected signal to the deskew signal generating circuit 12. The deskew signal generating circuit 12 generates a signal (deskew signal) for skew adjustment from two or more (e.g., 3 bits) successive bits of the data signal of the channel selected by the selector 11, and outputs the generated signal to the receiver-end IF 2.

Figure 2:
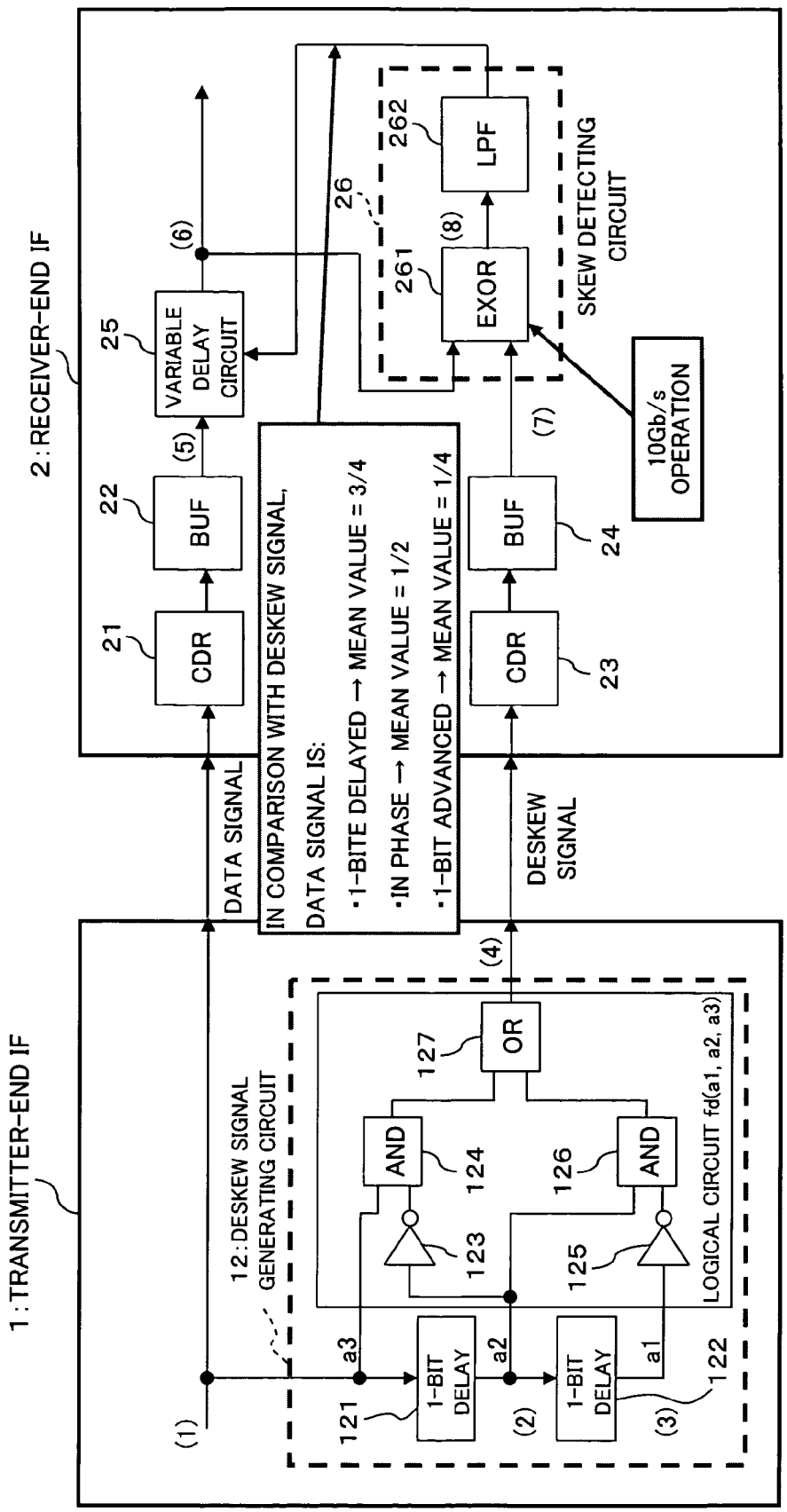
FIG. 2 is a block diagram showing constructions of a transmitter-end interface (IF) and a receiver-end interface (IF) to which is applied a skew adjusting circuit for parallel signals according to the first embodiment of the present invention.

More precisely, as shown in FIG. 2, the deskew signal generating circuit 12 includes: 1-bit delay circuits 121 and 122; a logical circuit fd having inverting circuits 123 and 125, AND (logical AND) circuits 124 and 126, and an OR (logical OR) circuit 127. A data signal a1 which has been delayed by two bits by the 1-bit delay circuits 121 and 122 is then inverted by the inverting circuit 125. The resultant signal and a data signal a2 which has been delayed by the 1-bit delay circuit 121 are subjected to a logical AND operation performed by the AND circuit 126. Further, the data signal a2 which has been delayed by one bit by the 1-bit delay circuit 121 is inverted by the inverting circuit 123. The resultant signal and a data signal a3 before being delayed are subjected to a logical AND operation performed by the AND circuit 124. Then, the OR circuit 127 carries out the logical OR between the above logical AND results obtained by the AND circuits 124 and 126, thereby generating a deskew signal. That is, the deskew signal generating circuit 12 generates a deskew signal with the logical circuit fd (a1, a2, and a3) which performs an operation expressed by the following formula (1) using three successive bits (a1, a2, and a3) of the data signal.

$$fd(a1,a2,a3)=\overline{a1}\times a2+\overline{a2}\times a3 \qquad (1)$$

where $\overline{a1}$ is an inversion of a1, and $\overline{a2}$ is an inversion of a2.

In the receiver-end IF 2, the CDR circuit 21 performs clock and data reproduction processing in response to the data signal (main signal) from the transmitter-end IF 1. The buffer 22 temporarily holds the data signal which has been subjected to the clock/data reproduction processing by the CDR circuit 21. The variable delay circuit (delay amount adjusting circuit) 25 controls the delay amount of the data signal from the buffer 22 in accordance with a skew detection result (selected by the selector 28 for each channel according to the above channel selecting signal) obtained by the skew detecting circuit 26, to compensate for (adjust) the skew (deskew) among the channels.

Upon receipt of the deskew signal from the deskew signal generating circuit 12 in the transmitter-end IF 1, the CDR circuit 23 performs clock and data reproduction processing. The buffer 24 temporarily holds the data signal which has been subjected to the clock/data reproduction processing by the CDR circuit 23. The skew detecting circuit 26 detects skew among the data signals based on an output (data signal) of a variable delay circuit 25, which output is selected by the selector 29 for each channel, and on the deskew signal from the buffer 24. Here, an EXOR (exclusive OR) circuit carries out an exclusive OR operation (operation of correlation among bit patterns) between the output (data signal) of the variable delay circuit 25 and the deskew signal from the buffer 24. The Low-Pass Filter (LPF) 262, which serves as an average circuit, averages the result of the operation, whereby a skew of ±1 bit is detected.

In this instance, if the data signal of each channel has a bit rate of 10 Gb/s, it is preferable that the above EXOR circuit 261 also operates at a bit rate of 10 Gb/s and that the LPF 262 has a cut-off frequency fc of 1 MHz or lower. Further, if the data signal includes a header signal, etc., which reveals an unbalanced bit pattern, a time constant of the LPF 262 is preferably set to a value sufficiently longer than the length of the header. For example, when STM-256 signals (OC-768 in the case of SONET) in SDH are treated, a specific bit pattern, such as a frame synchronization pattern, repeatedly appears in the header. Thus, the time constant should be set to a value sufficiently longer than the length of the header.

The channel selecting circuit 27 generates a channel selecting signal for specifying channels which are to be selected by the selectors 28 and 29 and the selector 11 of the transmitter-end IF 1. For example, it is possible to realize deskew time equivalent to that of SFI-5 by sequentially switching selected channels at a time duration of 10 us for each channel.

The selector 28 selects a variable delay circuit 25 of a channel to which a skew detection result (the output of LPF 26) of the skew detecting circuit 26 is to be supplied as a deskew signal in accordance with a channel selecting signal from the channel selecting circuit 27. The selector 29 selects a data signal of a skew detection object channel which is to be output to the skew detecting circuit 26 in accordance with the channel selecting signal from the channel selecting circuit 27.

That is, a block including the selector 11, the deskew signal generating circuit 12, the skew detecting circuit 26, the channel selecting circuit 27, the variable delay circuit 25, and the selectors 28 and 29, functions as the skew adjusting circuit for parallel signals of the present invention.

Figure 3:
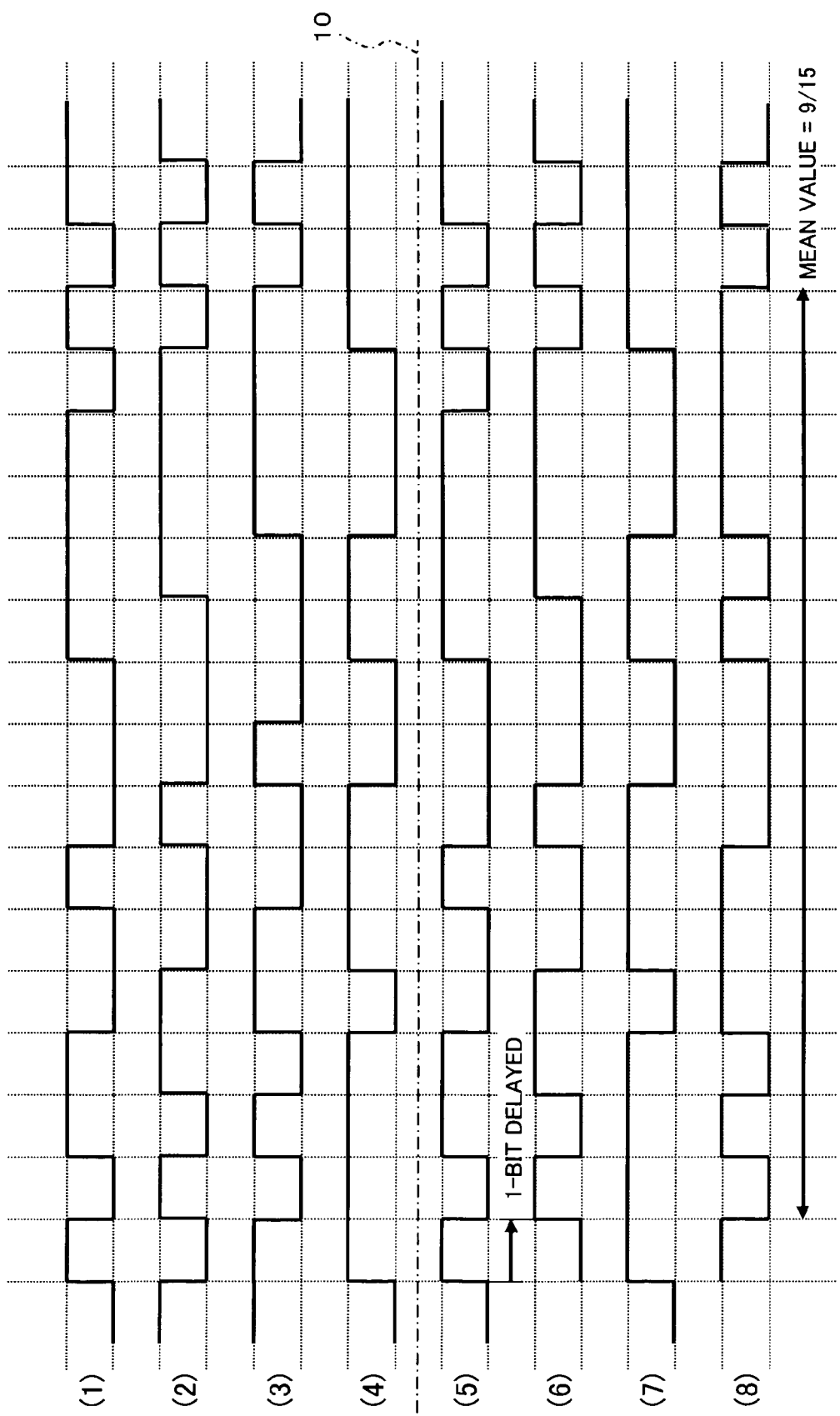
FIG. 3 is a timing chart for describing skew detection and a deskew operation under the construction of FIG. 1 and FIG. 2.
Figure 4:
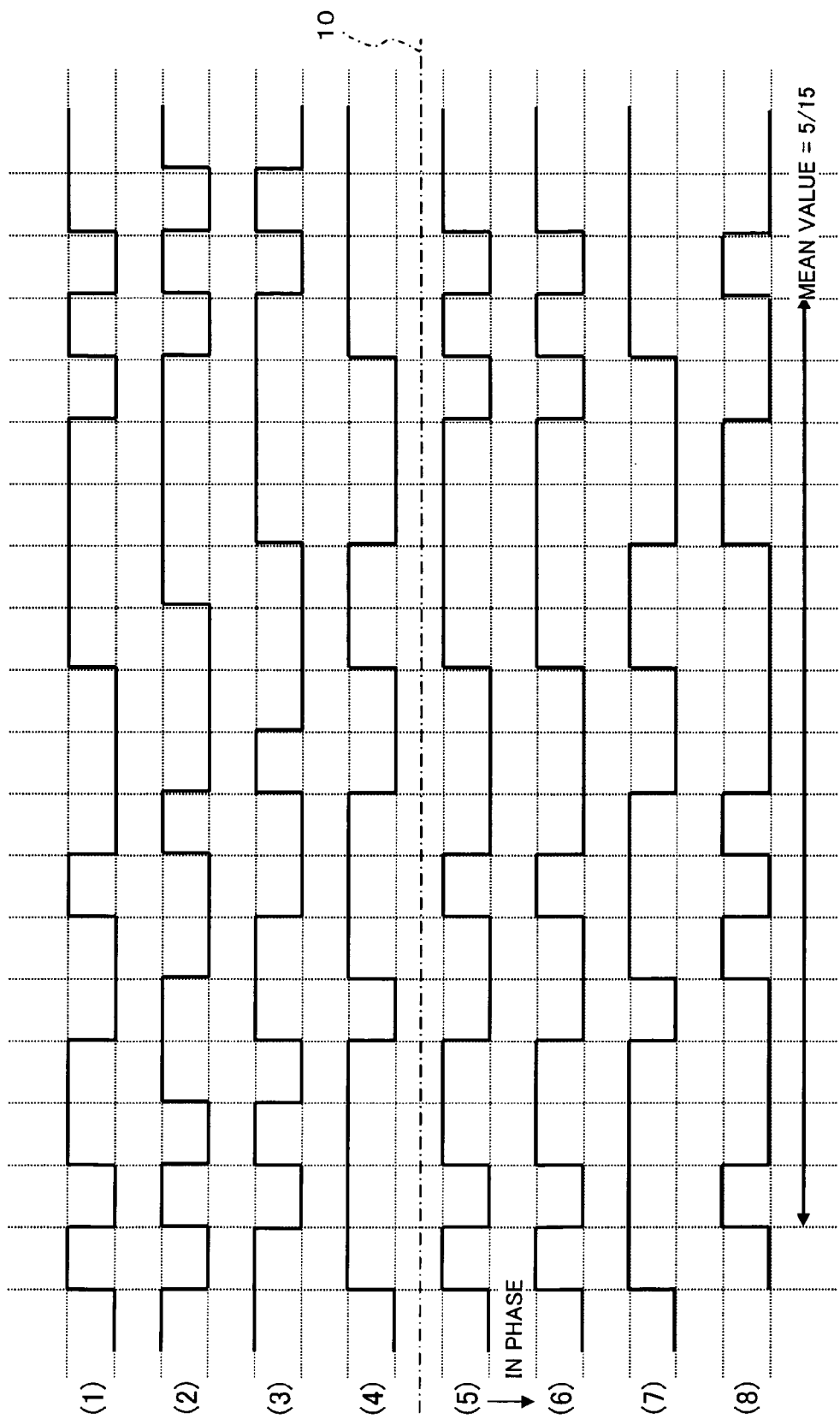
FIG. 4 is a timing chart for describing skew detection and a deskew operation under the construction of FIG. 1 and FIG. 2.
Figure 5:
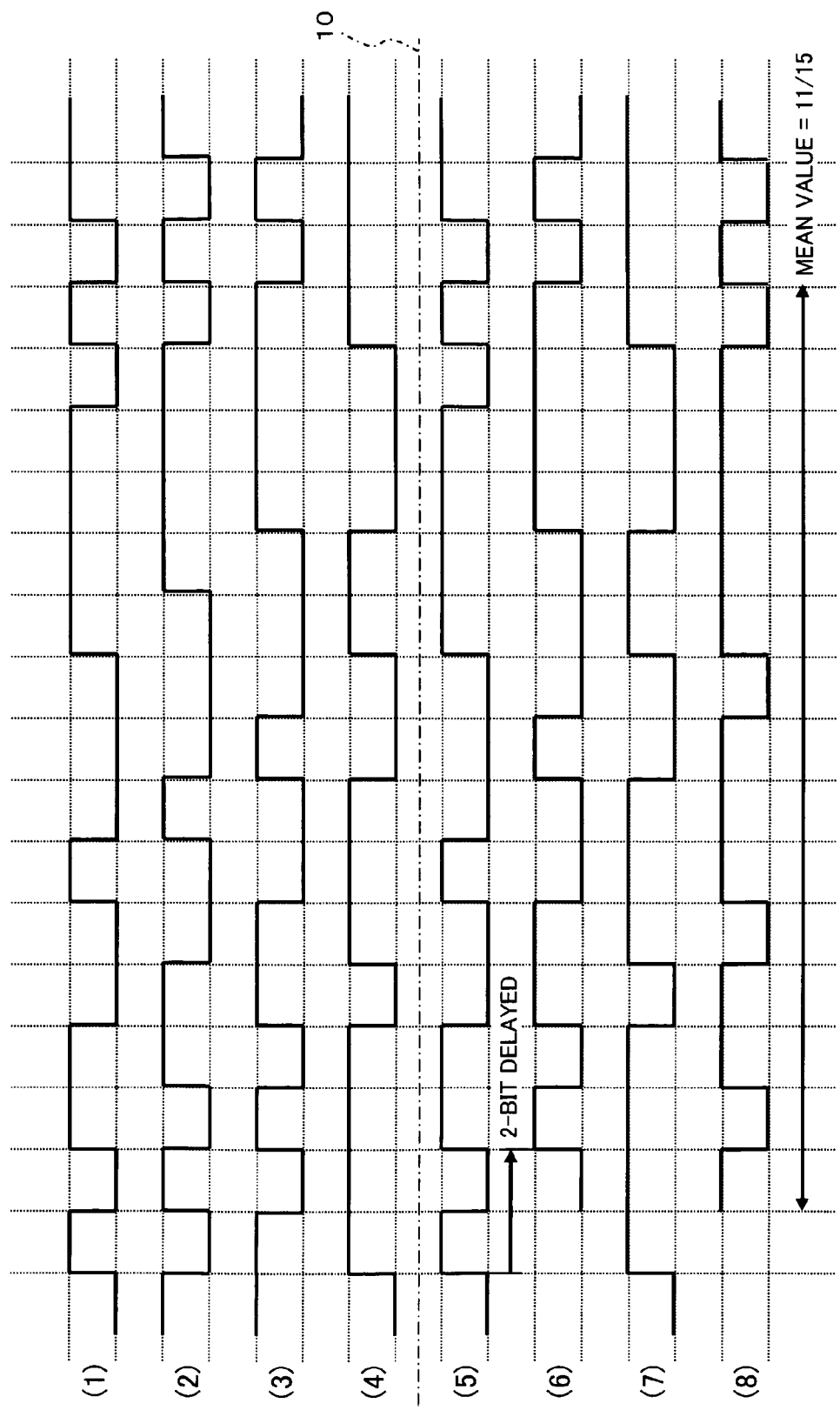
FIG. 5 is a timing chart for describing skew detection and a deskew operation under the construction of FIG. 1 and FIG. 2.

Now, referring to FIG. 2 through FIG. 5, a description will be made hereinbelow of a deskew operation when parallel signals are transmitted between the transmitter-end IF 1 and the receiver-end IF 2. Here, since the operation is the same among all the channels, a construction for only one channel is shown in FIG. 2. FIG. 3, FIG. 4, and FIG. 5 show timing charts when the skew, detected by the skew detecting circuit 26, is 0, −1, and +1, respectively. Signals at positions (1) through (8) in FIG. 2 correspond to signals designated by (1) through (8) in FIG. 3 through FIG. 5. In this instance, in FIG. 3 though FIG. 5, signal waves (1) through (4) and signals waves (5) through (8) are shown on the same time axis for convenience of illustration, but delay time corresponding to the transmission distance between the transmitter-end IF 1 and the receiver-end IF 2 is practically generated in signal waves (5) through (8) in comparison with signal waves (1) through (4). The alternating long and short dashed lines 10 in FIG. 3 through FIG. 5 indicate this fact.

First of all, in the transmitter-end IF 1, a deskew signal is produced by the deskew signal generating circuit 12 from the data signal of a channel detected by the selector 11. For example, assuming that a data signal (a1) having the waveform (1) in FIG. 3 through FIG. 5 is input to the deskew signal generating circuit 12, the output (a2) of the 1-bit delay circuit 121 has the waveform (2) in FIG. 3 through FIG. 5, and the output (a1) of the 1-bit delay circuit 122 has the waveform (3) in FIG. 3 through FIG. 5. Thus, the output of the logical circuit fd (that is, deskew signal) becomes the signal (4) in FIG. 3 through FIG. 5 after the logical operation indicated by the above formula (1).

The above data signal and the deskew signal are transmitted to the receiver-end IF 2. In the receiver-end IF 2, the data signal and the deskew signal are subjected to clock and data reproduction processing by the corresponding CDR circuits 21 and 23, respectively, and are then temporarily held in the buffers 22 and 24, respectively. Accordingly, the output of the buffer 22 (the input of the variable delay circuit 25) has the signal waveform (5) shown in FIG. 3 through FIG. 5, and the output of the buffer 24 has the signal waveform (7) in FIG. 3 through FIG. 5.

Here, assuming that the variable delay amount of the variable delay circuit 25 is 0 bits, 1 bit, and 2 bits, and that the standard delay amount of the variable delay circuit 25 is 1 bit under a condition in which the received data signal and the deskew signal are in phase, the output of the variable delay circuit has the signal wave (6) in FIG. 3. Accordingly, the output of the EXOR circuit 261 of the skew detecting circuit 26 has the waveform (8) in FIG. 3. Then, after averaging by the EXOR circuit 262, the average value (mark rate)≈½ is obtained.

Under a condition in which the data signal is delayed from the deskew signal by 1 bit (this is equivalent to a condition in which the delay amount of the variable delay circuit 25 is 0 bits), the output of the variable delay circuit 25 has the signal waveform (6) in FIG. 4. Accordingly, the output of the EXOR circuit 261 of the skew detecting circuit 26 has the waveform (8) in FIG. 4. Then, after averaging by the EXOR circuit 262, the mark rate≈¼ is obtained.

Further, under a condition in which the data signal is delayed from the deskew signal by 1 bit (this is equivalent to a condition in which the delay amount of the variable delay circuit 25 is 2 bits), the output of the variable delay circuit 25 has the signal waveform (6) in FIG. 5. Accordingly, the output of the EXOR circuit 261 of the skew detecting circuit 26 has the waveform (8) in FIG. 5. Then, after averaging by the EXOR circuit 262, the mark rate≈¾ is obtained.

That is, the deskew signal generating circuit 12 is constructed so that if the skew is 0 bits, −1 (1-bit advanced) bit, and +1 bit (1-bit delayed), the average value of the output signal of the EXOR circuit 261 is ½, ¼, and ¾, respectively. In other words, the deskew signal generating circuit 12 has a logical circuit fd which performs a logical operation using two or more successive bits of the data signal (main signal) so that the above-mentioned average value, which is obtained by the skew detecting circuit 26 corresponding to the amount of skew, reveals a specific change.

In this instance, since FIG. 3 through FIG. 5 show the average values of 15-bit repetition patterns, so that the value is deviated from the theoretical value (values of 9/15, 5/15, and 11/15 are revealed). However, the average values with respect to a signal with a mark rate of ½, the average values are ½, ¼, and ¾, respectively.

Accordingly, it is possible to detect skew of 0 bit and ±1 bit from the output of the LPF 262 (the average value of the exclusive OR between the data signal and the deskew signal), and the delay amount of the variable delay circuit 25 is controlled by the average value, whereby deskew is carried out.

In this manner, according to the present embodiment, a deskew signal is produced from 3 successive bits of any (channel) of parallel signals. In the receiver-end IF 2, the exclusive OR between the signal of the channel and the deskew signal is obtained and then averaged, whereby 0-bit and ±1-bit skew is detected. Since deskew is performed by controlling the detected skew by the variable delay circuit 25, it is possible to detect skew and to perform deskew based on the above average value, without comparing (bit pattern matching) individual bits.

Accordingly, in cases where a high-speed signal at a bit rate of 40 Gb/s is transmitted as parallel signals such as 10 Gb/s×4 channels, it is no longer necessary to performs large-scale logic processing, such as frame synchronization and pattern matching of individual bits of the data signal of each channel, so that large-scale reduction in circuit size and power consumption becomes available. In particular, according to the present embodiment, partly since the range of deskew is limited to ±1 UI and partly since skew detection is carried out with a DC signal (average value), the deskew signal generating circuit 12 and the skew detecting circuit 26 are realized by a simple and easy logical circuit (high-speed device), so that the effects of the present invention are considerable.

(A1) Modified Example of Deskew Signal Generating Circuit 12 (Logical Circuit fd)

The construction of the deskew signal generating circuit 12 should by no means be limited to that of FIG. 2, and there are other constructions which exert effects and benefits similar to those of the above embodiment. For example, constructions shown in FIG. 6, FIG. 7 and FIG. 8 can be employed as example constructions of the logical circuit fd. In such cases, it is also possible to detect 0-bit and ±1-bit skew by obtaining the average value of bit pattern correlation (exclusive OR) between the data signal and the deskew signal by using the EXOR circuit 261 and the LPF 262 of the receiver-end IF 2, and deskew can be carried out by controlling the delay amount of the variable delay circuit 25 with the average value.

Figure 6:
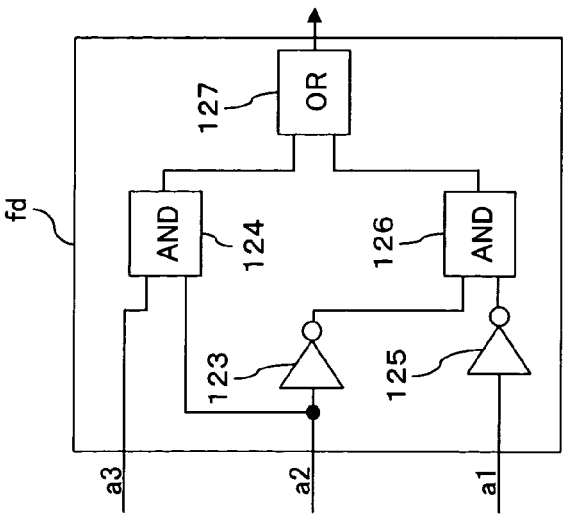
FIG. 6 is a block diagram showing a first modified example of the deskew signal generating circuit of FIG. 1 and FIG. 2.
Figure 7:
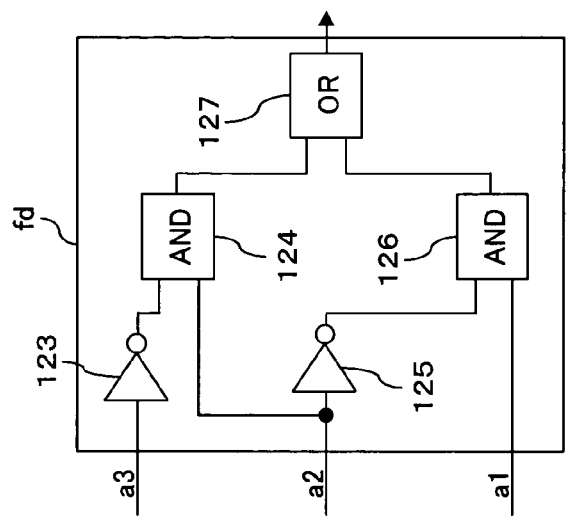
FIG. 7 is a block diagram showing a second modified example of the deskew signal generating circuit of FIG. 1 and FIG. 2.
Figure 8:
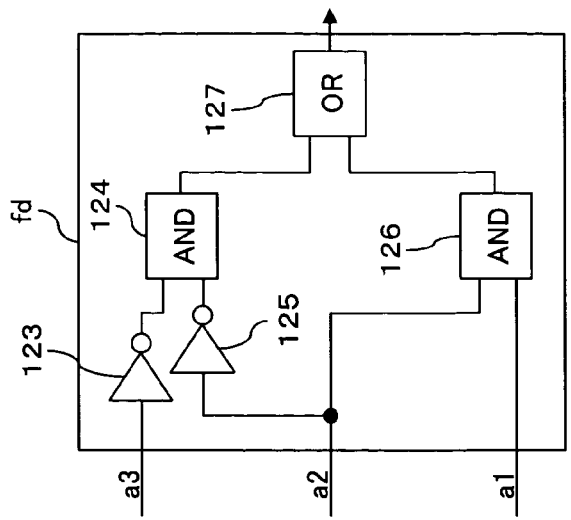
FIG. 8 is a block diagram showing a third modified example of the deskew signal generating circuit of FIG. 1 and FIG. 2.

More specifically, FIG. 6 shows a construction in which a logical operation of the following formula (2) is used to produce a deskew signal; FIG. 7 shows a construction in which a logical operation of the following formula (3) is used to produce a deskew signal; FIG. 8 shows a construction in which a logical operation of the following formula (4) is used to produce a deskew signal. In any of the above cases, simple logical circuits, such as the inverting circuits 123 and 125, the AND circuits 124 and 126, and the OR circuit 127, can be employed, and it is possible to detect 0-bit and ±1-bit skew by obtaining the average value of the exclusive OR between the deskew signal and the data signal.

$$fd(a1, a2, a3) = \overline{a1} \times \overline{a2} + a2 \times a3 \quad (2)$$

$$fd(a1, a2, a3) = a1 \times \overline{a2} + a2 \times \overline{a3} \quad (3)$$

$$fd(a1, a2, a3) = a1 \times a2 + \overline{a2} \times \overline{a3} \quad (4)$$

where $\overline{a1}$ is an inversion of a1; $\overline{a2}$ is an inversion of a2; $\overline{a3}$ is an inversion of a3.

More precisely, the logical circuit fd of FIG. 6 includes: the AND circuit 126; the AND circuit 124; and the OR circuit 127. The AND circuit 126 carries out the logical AND between a signal obtained by inverting a signal a1, which is a data signal having been delayed by 2 bits by the 1-bit delay circuits 121 and 122, by the inverting circuit 125 and a signal obtained by inverting a signal a2, which is the data signal having been delayed by 1 bit. The AND circuit 124 carries out the logical AND between a signal a2, which is a data signal having been delayed by 1 bit by the 1-bit delay circuit 121, and a data signal a3 before being delayed. The OR circuit 127 produces a deskew signal by carrying out the logical OR between the outputs of the AND circuits 124 and 126.

The logical circuit fd of FIG. 7 includes: the AND circuit 126; the AND circuit 124; and the OR circuit 127. The AND circuit 126 carries out the logical AND between a signal a1, which is a data signal having been delayed by 2 bits by the 1-bit delay circuits 121 and 122, and a signal obtained by inverting a signal a2, which is a data signal having been delayed by 1 bit by the 1-bit delay circuit 121, by the inverting circuit 125. The AND circuit 124 carries out the logical AND between a signal a2, which has been delayed by 1-bit by the 1-bit delay circuit 121, and the data signal a3 before being delayed. The OR circuit 127 produces a deskew signal by carrying out the logical OR between the outputs of the AND circuits 124 and 126.

The logical circuit fd of FIG. 8 includes: the AND circuit 126; the AND circuit 124; and the OR circuit 127. The AND circuit 126 carries out the logical AND between a signal a1, which is a data signal having been delayed by 2 bits by the 1-bit delay circuits 121 and 122, and a signal a2, which is a data signal having been delayed by 1 bit by the 1-bit delay circuit 121. The AND circuit 124 carries out the logical AND between a signal obtained by inverting a signal, having been delayed by 1 bit by the 1-bit delay circuit 121, by the inverting circuit 125 and a data signal a3 obtained by inverting a signal a3, before being delayed, by the inverting circuit 123. The OR circuit 127 produces a deskew signal by carrying out the logical OR between the outputs of the AND circuits 124 and 126.

In this instance, the construction of FIG. 7 and FIG. 8 needs an inverting circuit for the output of the skew detecting circuit 26, because the relationship between a change in the average value of the output of the skew detecting circuit 26 and the skew direction (advance and delay) in the construction of FIG. 7 and FIG. 8 is opposite to the relationship in the aforementioned embodiment described referring to FIG. 1 and FIG. 2.

Figure 9:
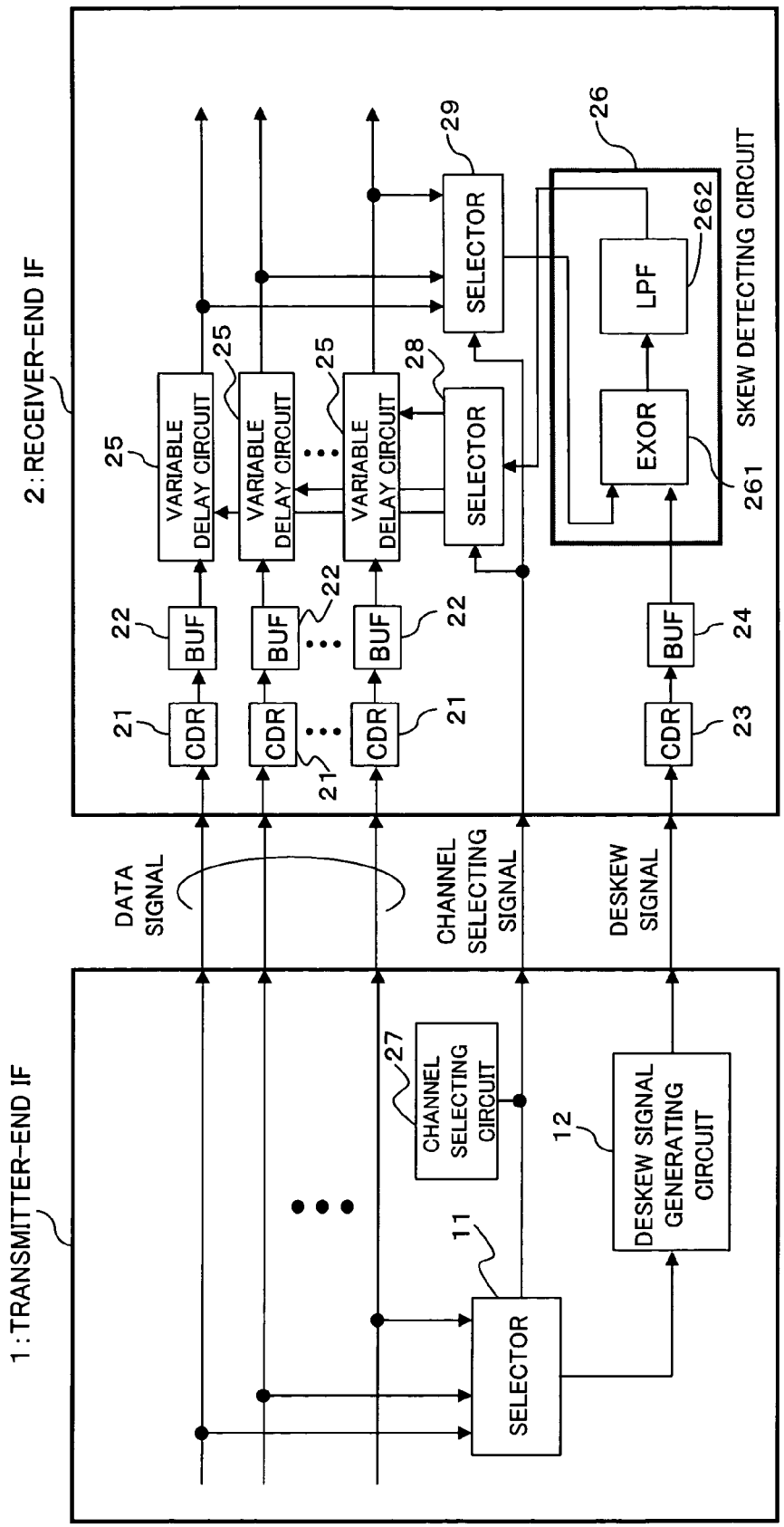
FIG. 9 is a block diagram showing a modified example of the construction of FIG. 1 and FIG. 2.

Here, as shown in FIG. 9, for example, the channel selecting circuit 27 of FIG. 1 can be provided for the transmitter-end IF 1, thereby realizing like effects and benefits of the above example, and the same goes for the following embodiments.

(B) Second Embodiment

Figure 10:
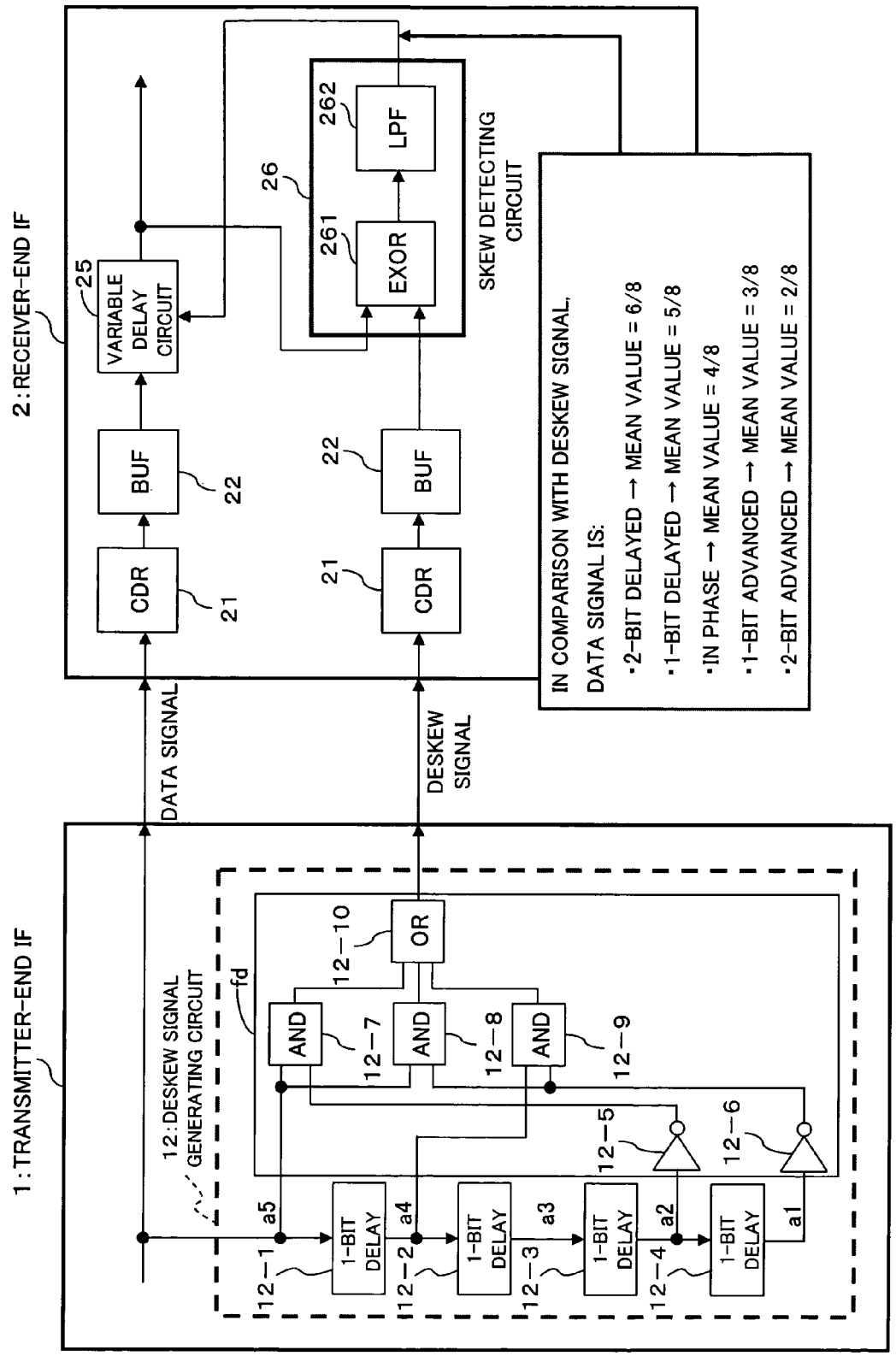
FIG. 10 is a block diagram showing constructions of a transmitter-end interface (IF) and a receiver-end interface (IF) to which is applied a skew adjusting circuit for parallel signals according to a second embodiment of the present invention.

In the above first embodiment, the deskew signal is produced from three successive bits of the data signal (main signal), thereby realizing a range of deskew of ±1 bit (1 UI). However, it is also possible to realize a range of deskew of ±2 bit (2 UI) by producing a deskew signal from five successive bits. The construction in this case is shown in FIG. 10. Like the construction of FIG. 2, the construction of FIG. 10 also shows only one channel. The construction of FIG. 10 differs from the construction of FIG. 1 and FIG. 2 in that the transmitter-end IF 1 includes (as the deskew signal generating circuit 12): 1-bit delay circuits 12-1 through 12-4; and a logical circuit fd having inverting circuits 12-5 and 12-6, AND circuits 12-7, 12-8, and 12-9, and an OR circuit 12-10. The construction of the receiver-end IF 2 is the same as or similar to the construction described above with reference to FIG. 1 and FIG. 2 unless otherwise described, except for the fact that the variable bit width of the variable delay circuit 25 is 4 bits.

Here, each of the 1-bit delay circuits 12-1 through 12-4 delays a data signal (main signal), which is transmitted to the receiver-end IF 2 on a specific channel (selected by the channel selecting circuit 27), by 1 bit. With these 1-bit delay circuits 12-1 through 12-4, a signal of five successive bits a1, a2, a3, a4, and a5 are obtained.

In addition, in the logical circuit fd, the inverting circuit 12-5 inverts the output (a2) of the 1-bit delay circuit 12-3, and the inverting circuit 12-6 inverts the output (a1) of the 1-bit delay circuit 12-4.

The AND circuit 12-7 carries out the logical AND between a data signal (a5) before being delayed by the 1-bit delay circuit 12-1 and the output of the inverting circuit 12-5 (that is, the inverted signal of the signal a2). The AND circuit 12-8 carries out the logical AND between a data signal (a5) before being delayed by the 1-bit delay circuit 12-1 and the output of the inverting circuit 12-6 (that is, the inverted signal of the signal a1). The AND circuit 12-9 carries out the logical AND between the output (a4) of the 1-bit delay circuit 12-1 and the output of the inverting circuit 12-6 (that is, the inverted signal of the signal a1). The OR circuit 12-10 carries out the logical OR among the outputs of the AND circuits 12-7, 12-8, and 12-9.

That is, the logical circuit fd generates a deskew signal by performing an operation expressed by the following formula (5) using five successive bits (a1, a2, a3, a4, and a5) of the data signal.

$$fd(a1,a2,a3,a4,a5) = \overline{a1} \times a5 + \overline{a2} \times a5 + \overline{a1} \times a4 \quad (5)$$

where $\overline{a1}$ is an inversion of a1, and $\overline{a2}$ is an inversion of a2.

By using such a deskew signal, on the receiver-end IF 2, the skew detecting circuit 26 obtains the average value (mark rate) of the exclusive OR between the deskew signal and the data signal, thereby detecting ±2-bit skew. That is, as shown in FIG. 10, when the output (average value) of the LPF 262±⁶⁄₈, the data signal is detected to be 2-bit delayed in comparison with the deskew signal. When the average value=⁵⁄₈, the data signal is detected to be 1-bit delayed in comparison with the deskew signal. When the average value=⁴⁄₈, the data signal and the deskew signal are in phase. When the average value=³⁄₈, the data signal is 1-bit advanced in comparison with the deskew signal. When the average value=²⁄₈, the data signal is 2-bit advanced in comparison with the deskew signal.

In other words, the deskew signal generating circuit 12 is constructed so that when the skew is 0 bits, −2 bits (2-bit advanced), −1 bit (1-bit advanced), +1 bit (1-bit delayed), and +2 bits (2-bit delayed), the average value of the output signal of the EXOR circuit 261 is ⁴⁄₈, ²⁄₈, ³⁄₈, ⁵⁄₈, and ⁶⁄₈, respectively.

It is thus possible to detect 0-bit and ±12-bit skew based on the output (the average value of the exclusive OR between the data signal and the deskew signal) of the LPF 262, and the delay amount of the variable delay circuit 25 is controlled by the average value, whereby deskew is carried out.

The above logical circuit fd of the present embodiment should by no means be limited to the construction shown in FIG. 10, and there are other constructions which can realize effects and benefits similar to those of the above embodiment. As an example, employing the construction of FIG. 11 as the construction of the logical circuit fd also makes it possible to obtain the average value of the exclusive OR between the data signal and the deskew signal by means of the EXOR circuit 261 and the LPF 262 of the receiver-end IF 2, whereby 0-bit and ±2-bit skew is detected. The delay amount of the variable delay circuit 25 is controlled by the average value, thereby realizing deskew of a range of ±2 bits.

Figure 11:
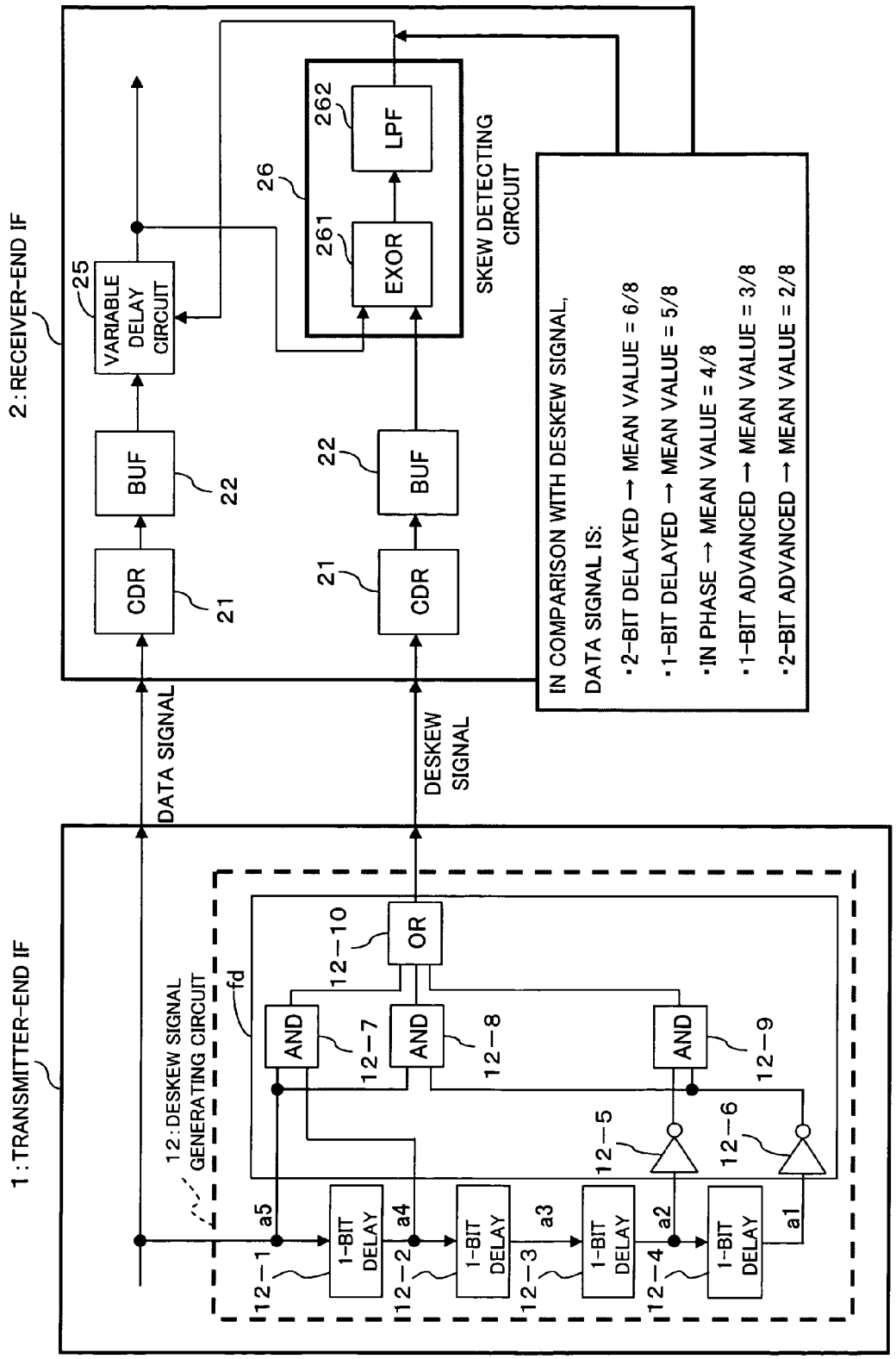
FIG. 11 is a block diagram showing a modified example of the construction (deskew signal generating circuit) of FIG. 10.

More specifically, FIG. 11 shows a construction for producing a deskew signal by the logical operation expressed by the following formula (6). In this case, also, the construction is realized by simple logical circuits, i.e., the inverting circuits 12-5 and 12-6 and the AND circuits 12-7, 12-8, and 12-9, and the OR circuit 12-10. On the receiver-end IF 2 (skew detecting circuit 26), the average value of the exclusive OR between the deskew signal and the data signal is obtained, whereby O-bit and +2-bit skew is detected (deskew of a range of ±2 bits is available)

$$fd(a1,a2,a3,a4,a5) \overline{a1} \times \overline{a2} + \overline{a1} \times a5 + a4 \times a5 \quad (6)$$

where $\overline{a1}$ is an inversion of a1, and $\overline{a2}$ is an inversion of a2.

That is, the logical circuit fd of the present example includes AND circuits 12-7, 12-18 and 12-9 and an OR circuit 12-10. The AND circuit 12-9 carries out the logical AND between a signal obtained by inverting a data signal a1, which has been delayed by 4 bits by the 1-bit delay circuits 12-1 through 12-4, by the inverting circuit 12-6 and a signal obtained by inverting a data signal a2, which has been delayed by 3 bits by the 1-bit delay circuits 12-1 through 12-3, by the inverting circuit 12-5. The AND circuit 12-8 carries out the logical AND between a signal obtained by inverting a data signal a1, which has been delayed by 4 bits by 1-bit delay circuits 12-1 through 12-4, by the inverting circuit 12-6 and the data signal a5. The AND circuit 12-7 carries out the logical AND between a data signal a4, which has been delayed by 1 bit by the 1-bit delay circuit 12-1, and the data signal a5 before being delayed. The OR circuit 12-10 which produces a deskew signal by carrying out the logical OR among the outputs of the AND circuits 12-7, 12-8, and 12-9.

As described so far, according to the present embodiment, a deskew signal is generated from five successive bits of any (channel) of the parallel signals transmitted, and the exclusive OR is carried out between the channel signal and the deskew signal on the receiver-end IF 2 and then averaged, whereby 0-bit and ±2-bit deskew is detected. The detected skew is controlled by the variable delay circuit 25, thereby performing deskew of a range of ±2-bits. Therefore, effects and benefits similar to those of the first embodiment are realized. In addition, since only change in the construction of the deskew signal generating circuit 12 (logical circuit fd) is necessary (change in the skew detecting circuit 26 is not necessary), the present embodiment is superior in flexibility (expandability).

Here, in a similar manner to the above, if the deskew signal generating circuit 12 (logical circuit fd) changes (increases) the number of bits of the data signal used in generating a deskew signal, a wider range of skew detection and deskew is realized.

Further, the present invention should by no means be limited to the above-illustrated embodiment, but various changes or modifications may be suggested without departing from the gist of the invention.

As detailed so far, according to the present invention, skew detection and deskew are performed using an average value of correlation between a data signal and a deskew signal, without necessity of large-scale logic processing such as bit pattern matching of a data signal, so that large-scale reduction in circuit size and power consumption is available. Consequently, the present invention is considered to be significantly useful in communication apparatuses which perform parallel signal transmission between a receiver-end and a transmitter-end circuit.

What is claimed is:

1. A skew adjusting circuit for parallel signals, which circuit adjusts skew among parallel signals when data signals are transmitted in parallel from a transmitting circuit to a receiving circuit, said skew adjusting circuit comprising:
    a selecting circuit which sequentially selects each of the parallel signals;
    a deskew signal generating circuit which generates a deskew signal, which is for adjusting skew, by performing a predetermined logical operation using a plurality of successive bits of a data signal selected by said selecting circuit and transmits the deskew signal to said receiving circuit;
    a skew detecting circuit provided for said receiving circuit, which circuit detects the skew by obtaining correlation between the deskew signal and the data signal selected by said selecting circuit and then obtaining an average value of the correlation; and
    a delay amount adjusting circuit provided for said receiving circuit, which circuit adjusts the skew by controlling the amount of delay of the data signal in accordance with the average value obtained by said skew detecting circuit.

2. A skew adjusting circuit for parallel signals as set forth in claim 1, wherein said deskew signal generating circuit includes a logical circuit which performs the logical operation using said plurality of successive bits of the data signal so that said average value, which is obtained by said skew detecting circuit in accordance with said amount of skew, reveals a specified change.

3. A skew adjusting circuit for parallel signals as set forth in claim 2, wherein said logical circuit performs the logical operation using three successive bits of the data signal so that when the skew of the data signal with a mark rate of ½ is 0 bit, 1-bit advanced, and 1-bit delayed, said average value obtained by said skew detecting circuit is ½, ¼, and ¾, respectively.

4. A skew adjusting circuit for parallel signals as set forth in claim 3, wherein said logical circuit includes:
    a first AND circuit which carries out the logical AND between an inversion signal of a 2-bit delayed signal of the data signal and a 1-bit delayed signal of the data signal;
    a second AND circuit which carries out the logical AND between the data signal and an inversion signal of a 1-bit delayed signal of the data signal; and
    a first OR circuit which generates the deskew signal by carrying out the logical OR between the outputs of said first and second AND circuits.

5. A skew adjusting circuit for parallel signals as set forth in claim 3, wherein said logical circuit includes:
    a third AND circuit which carries out the logical AND between an inversion signal of a 2-bit delayed signal of the data signal and an inversion signal of a 1-bit delayed signal of the data signal;
    a fourth AND circuit which carries out the logical AND between a 1-bit delayed signal of the data signal and the data signal before being delayed; and
    a second OR circuit which generates the deskew signal by carrying out the logical OR between the outputs of said third and fourth AND circuits.

6. A skew adjusting circuit for parallel signals as set forth in claim 3, wherein said logical circuit includes:
    a fifth AND circuit which carries out the logical AND between a 2-bit delayed signal of the data signal and an inversion signal of a 1-bit delayed signal of the data signal;

a sixth AND circuit which carries out the logical AND between a 1-bit delayed signal of the data signal and the data signal before being delayed; and a third OR circuit which generates the deskew signal by carrying out the logical OR between the outputs of said fifth and sixth AND circuits.

7. A skew adjusting circuit for parallel signals as set forth in claim 3, wherein said logical circuit includes:

a seventh AND circuit which carries out the logical AND between a 2-bit delayed signal of the data signal and a 1-bit delayed signal of the data signal;

an eighth AND circuit which carries out the logical AND between an inversion signal of a 1-bit delayed signal of the data signal and an inversion signal of the data signal before being delayed; and a fourth OR circuit which generates the deskew signal by carrying out the logical OR between the outputs of said seventh and eighth AND circuits.

8. A skew adjusting circuit for parallel signals as set forth in claim 2, wherein said logical circuit performs the logical operation using five successive bits of the data signal so that when the skew of the data signal with a mark rate of ½ is 0 bit, 2-bit advanced, 1-bit advanced, 1-bit delayed, and 2-bit delayed, said average value obtained by said skew detecting circuit is $4/8$, $2/8$, $3/8$, $5/8$, and $6/8$, respectively.

9. A skew adjusting circuit for parallel signals as set forth in claim 8, wherein said logical circuit includes:

a ninth AND circuit which carries out the logical AND between an inversion signal of a 4-bit delayed signal of the data signal and a 1-bit delayed signal of the data signal;

a 10th AND circuit which carries out the logical AND between an inversion signal of a 4-bit delayed signal of the data signal and the data signal;

a 11th AND circuit which carries out the logical AND between an inversion signal of a 3-bit delayed signal of the data signal and the data signal; and a fifth OR circuit which generates the deskew signal by carrying out the logical OR between the outputs of said ninth through 11th AND circuits.

10. A skew adjusting circuit for parallel signals as set forth in claim 8, wherein said logical circuit includes:

a 12th AND circuit which carries out the logical AND between an inversion signal of a 4-bit delayed signal of the data signal and an inversion signal of a 3-bit delayed signal of the data signal;

a 13th AND circuit which carries out the logical AND between an inversion signal of a 4-bit delayed signal of the data signal and the data signal;

a 14th AND circuit which carries out the logical AND between a 1-bit delayed signal of the data signal and the data signal before being delayed; and a sixth OR circuit which generates the deskew signal by carrying out the logical OR between the outputs of said 12th through 14th AND circuits.

11. A skew adjusting circuit for parallel signals as set forth in claim 1, wherein said skew detecting circuit includes:

an exclusive OR circuit which obtains said correlation by carrying out the exclusive OR between the deskew signal and the data signal; and an average circuit which averages a result of the exclusive OR carried out by said exclusive OR circuit.

12. A skew adjusting circuit for parallel signals as set forth in claim 11, wherein said average circuit is a low-pass filter.

13. A skew adjusting circuit for parallel signals as set forth in claim 1, wherein said selecting circuit is provided within said receiving circuit.

14. A skew adjusting circuit for parallel signals as set forth in claim 1, wherein said selecting circuit is provided within said transmitting circuit.

15. A skew adjusting method for adjusting skew among parallel signals when data signals are transmitted in parallel from a transmitting circuit to a receiving circuit, said method comprising:

sequentially selecting each of the parallel signals;

generating a deskew signal, which is for adjusting skew, by performing a predetermined logical operation using a plurality of successive bits of a selected data signal, and transmitting the deskew signal to the receiving circuit;

detecting, in the receiving circuit, the skew by obtaining correlation between the deskew signal and the selected data signal and then obtaining an average value of the correlation; and adjusting, in the receiving circuit, the skew by controlling the amount of delay of the data signal in accordance with the average value.

* * * * *